(12) United States Patent
Senguttuvan et al.

(10) Patent No.: US 11,151,542 B2
(45) Date of Patent: Oct. 19, 2021

(54) WEARABLE PAYMENT DEVICE

(71) Applicant: PAYPAL, INC., San Jose, CA (US)

(72) Inventors: Guhan Senguttuvan, San Jose, CA (US); Satish Govindarajan, Los Altos, CA (US); Carlos Rivas, San Jose, CA (US); Gordon Lo, Fremont, CA (US); Anantharaj Uruthiralingam, San Jose, CA (US); Alan Jeung, San Jose, CA (US); Tinyen Shih, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 188 days.

(21) Appl. No.: 16/405,099

(22) Filed: May 7, 2019

(65) Prior Publication Data
US 2020/0356976 A1  Nov. 12, 2020

(51) Int. Cl.
*G06Q 20/32* (2012.01)
*G06Q 20/40* (2012.01)
*G06F 1/16* (2006.01)
*G06F 21/32* (2013.01)

(52) U.S. Cl.
CPC .......... *G06Q 20/322* (2013.01); *G06F 1/163* (2013.01); *G06F 21/32* (2013.01); *G06Q 20/40145* (2013.01)

(58) Field of Classification Search
None
See application file for complete search history.

(56) References Cited

U.S. PATENT DOCUMENTS

| | | | |
|---|---|---|---|
| 9,032,498 B1 | 5/2015 | Ben Ayed | |
| 9,384,481 B2* | 7/2016 | Hanson | G06Q 20/3278 |
| 9,430,763 B2 | 8/2016 | Calderon et al. | |
| 2005/0248458 A1* | 11/2005 | Girvin | G06K 19/07749 340/572.3 |
| 2006/0077060 A1* | 4/2006 | Lerch | G06K 19/07762 340/572.3 |
| 2011/0282785 A1 | 11/2011 | Chin | |
| 2012/0050532 A1* | 3/2012 | Rhyins | G08B 21/0288 348/143 |
| 2014/0249994 A1* | 9/2014 | Proud | A61B 5/0024 705/39 |
| 2015/0040210 A1* | 2/2015 | Faaborg | G06F 21/44 726/16 |
| 2015/0254661 A1 | 9/2015 | Lanc | |
| 2016/0080941 A1* | 3/2016 | Jakobsson | H04L 9/3226 726/7 |
| 2016/0154952 A1* | 6/2016 | Venkatraman | G06Q 20/321 705/44 |
| 2016/0189451 A1* | 6/2016 | Yoo | G06F 21/32 340/5.82 |
| 2016/0306393 A1* | 10/2016 | Huitema | G06F 1/1684 |
| 2016/0335615 A1* | 11/2016 | Kim | G06F 3/04883 |
| 2017/0011406 A1* | 1/2017 | Tunnell | H04W 12/06 |
| 2017/0032168 A1* | 2/2017 | Kim | G06Q 20/40145 |

(Continued)

*Primary Examiner* — Muhammad Adnan
(74) *Attorney, Agent, or Firm* — Haynes and Boone, LLP

(57) ABSTRACT

A wearable device receives authentication information from a user. In response to verifying the authentication information, the wearable device provides the user with access to one or more payment capabilities of the wearable device. In response to determining that the wearable device has been switched into an open state, the wearable device removes access to the one or more payment capabilities of the wearable device.

20 Claims, 9 Drawing Sheets

(56) References Cited

U.S. PATENT DOCUMENTS

| | | |
|---|---|---|
| 2018/0025351 A1 | 1/2018 | Chen et al. |
| 2018/0293568 A1* | 10/2018 | Gurunathan ............ G06Q 20/36 |
| 2018/0302416 A1* | 10/2018 | Einberg .............. H04L 63/0861 |
| 2019/0053739 A1* | 2/2019 | Inoue ................. A61B 5/02416 |
| 2019/0095926 A1* | 3/2019 | Li .................... G06Q 20/40145 |
| 2020/0167450 A1* | 5/2020 | Li ........................ H04L 63/0876 |
| 2020/0211023 A1* | 7/2020 | Kaja ........................ G06F 21/32 |
| 2020/0314644 A1* | 10/2020 | Dean ........................ H04W 4/80 |
| 2020/0342086 A1* | 10/2020 | Oung ................. G06K 9/00926 |

\* cited by examiner

WEARABLE PAYMENT DEVICE

TECHNICAL FIELD

The present disclosure relates to a wearable device, and more particularly to a wearable payment device capable of authenticating a user.

BACKGROUND

The payments landscape has changed drastically over the past decade. Today, more or more consumers demand a frictionless payments experience, not just online, but also when performing in-person transactions. Fintech companies have helped to revolutionize the online payments experience allowing consumers to complete payments and transfer funds at the touch of a button to an online merchant or to another user. Furthermore, smartphones have allowed for payments to be digitally completed in store via the use of a digital wallet. However, there is a need for additional devices for performing in-store transactions that are capable of providing simple and frictionless checkout experience to customers.

DETAILED DESCRIPTION

Figure 1:
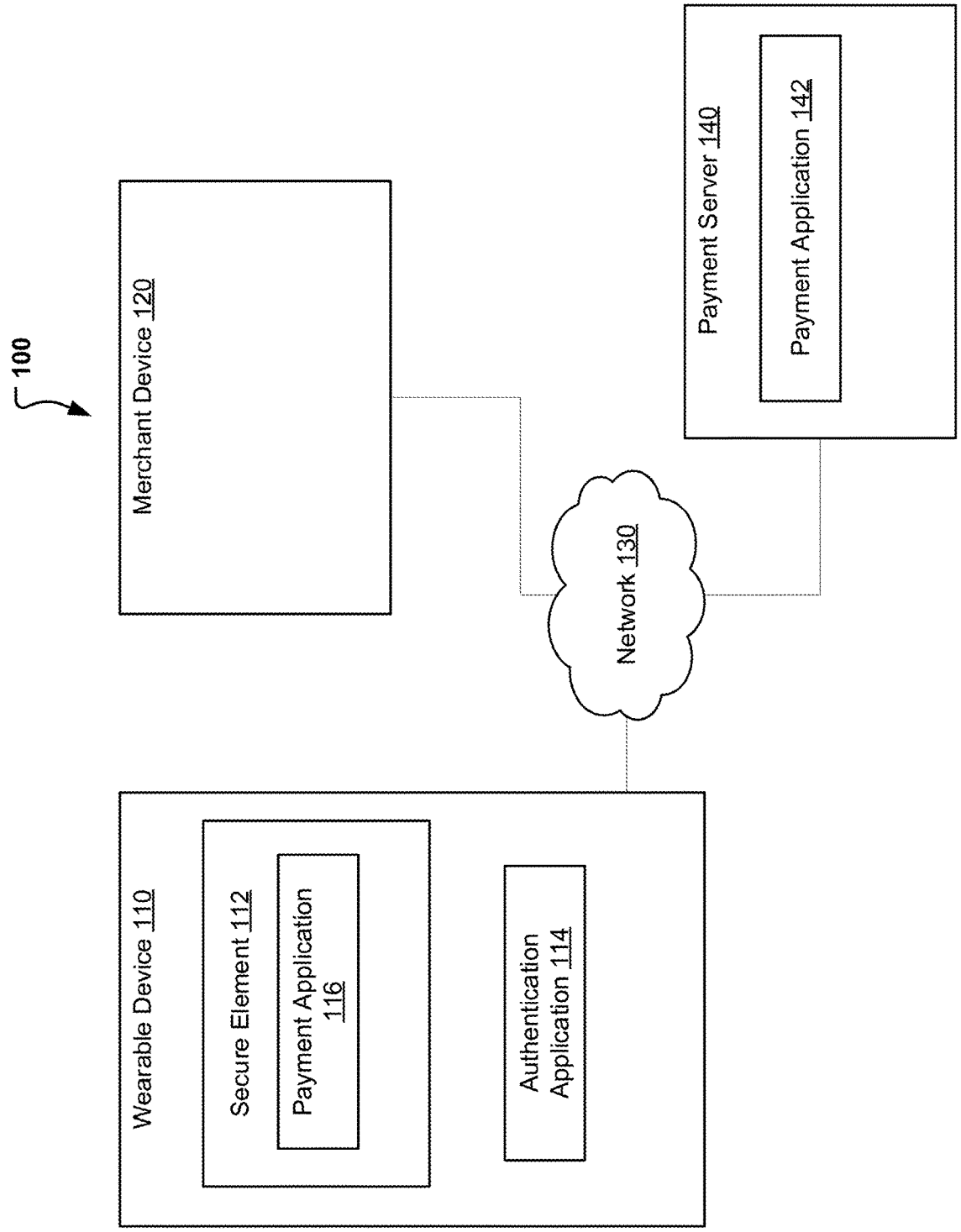
FIG. 1 illustrates an illustration of a payment system, in accordance with an embodiment.

Embodiments of the present disclosure provide a system, method, and program product. The wearable device receives authentication information from a user. In response to verifying the authentication information, the wearable device provides the user with access to one or more payment capabilities of the wearable device. In response to determining that the wearable device has been switched into an open state, the wearable device removes access to the one or more payment capabilities of the wearable device.

Furthermore, in one or more embodiments, a wearable device receives, during a first time period, authentication information from a user. The wearable device may then verify the authentication information. The wearable device may then cause, during a second time period, a first payment to be processed based on detecting that the wearable device is within a proximity of a first merchant device. The wearable device may then cause, during a third time period, a second payment to be processed based on detecting that the wearable device within the proximity of the first merchant device or a second merchant device, wherein the first payment and the second payment are processed without requiring input of authentication information after the first time period.

In the example embodiment, the present disclosure describes a solution that describes an authentication and payment process conducted by a wearable device. In the example embodiment, the wearable device includes a connection point where the wearable device may be opened and closed around the limb of a user. Furthermore, the wearable device is capable of detecting if the wearable device is in an "open" state or a "closed" state. In addition, the present disclosure describes a solution that includes, based on detecting that the wearable device is in an "closed" state, allowing authentication input to be received, and further allowing a payment functionality to be accessed based on the received authentication input matching stored authentication credentials. The present disclosure also describes, based on detecting that the wearable device is in an "open" state, removing access to the payment functionality of the wearable device.

Furthermore, the present disclosure describes a wearable device that provides frictionless payment ability, while also maintaining a high level of security. In the example embodiment, the wearable device described in the present disclosure may require authentication credentials to be provided when the wearable device is put on, however, after the initial authentication, the wearable device may be utilized to make payments via an NFC or network connection without requiring authentication information to be provided again as long as the wearable device remains in a "closed" state. Furthermore, if the wearable device is detected as being in an open state, the previously provided authentication may be discarded, rendering the wearable device unable to be utilized for making payments. Therefore, if the wearable device is taken off and lost, or if the wearable device falls on a user's wrist or limb, a fraudster would be unable to utilize the wearable device to perform fraudulent transactions.

Embodiments of the present disclosure will now be described in detail with reference to the accompanying Figures.

FIG. 1 illustrates payment system 100, in accordance with an embodiment. In the example embodiment, payment system 100 includes wearable device 110, merchant device 120 and payment server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between merchant device 120 and payment server 140.

In the example embodiment, merchant device 120 may be a desktop computer, a laptop computer, a tablet computer, a mobile device, a handheld device, a thin client, a beacon device, or any other electronic device or computing system capable of receiving and sending data to and from other computing devices, such as payment server 140, via network 130. Although not shown, optionally, merchant device 120 can comprise a cluster of servers executing the same software to collectively process requests as distributed by a front-end server and a load balancer. In the example embodiment, merchant device 120 is a computing device that is optimized for the support of payment requests received from other devices, such as wearable device 110. Furthermore, in the example embodiment, merchant device 120 is capable of connecting with other devices, such as wearable device 110, via a near field communication (NFC) connection, and receiving payment information for a purchase. In other embodiments, merchant device 120 may connect with other devices, via a wireless or other type of network connection. Merchant device 120 is described in more detail with regard to the figures.

In the example embodiment, payment server 140 includes payment application 142. In the example embodiment, payment server 140 may be a desktop computer, a laptop computer, a tablet computer, a mobile device, a handheld device, a thin client, or any other electronic device or computing system capable of receiving and sending data to and from other computing devices, such as merchant device 120, via network 130. Furthermore, in the example embodiment, payment server 140 is a computing device that is optimized for the support of programs that reside on payment server 140, such as payment application 142. Although not shown, optionally, payment server 140 can comprise a cluster of servers executing the same software to collectively process requests as distributed by a front-end server and a load balancer. Payment server 140 is described in more detail with regard to the figures.

Payment application 142 is a server-side payment application capable of responding to requests from merchant devices and client-side payment applications. Furthermore, payment application 142 is capable of receiving payment information and processing payments on behalf of merchants and consumers. Payment application 142 is described in more detail with regard to the figures.

In the example embodiment, wearable device 110 includes authentication application 114 and secure element 112. In the example embodiment, wearable device 110 is a wearable device such as a wearable bracelet, watch, glasses, or other wearable device. However, in other embodiments, wearable device 110 may be a desktop computer, a laptop computer, a tablet computer, a mobile device, a handheld device, a thin client, or any other electronic device or computing system capable of receiving and sending data to and from other computing devices, such as merchant device 120, via network 130. In the example embodiment, wearable device 110 may communicate with other computing devices via an NFC connection, however, in other embodiments, wearable device 110 may communicate with other devices via a wireless connection or another type of network connection. Furthermore, in the example embodiment, wearable device 110 includes a fingerprint reader, while in other embodiments, wearable device 110 may include mechanism for capturing other types of biometric information. Wearable device 110 is described in more detail with regard to the figures.

In the example embodiment, secure element 112 includes payment application 116. In the example embodiment, secure element 112 is a microprocessor chip that securely stores payment application 116, and further may store a key that may be used to digitally sign data. In the example embodiment, payment application 116 is a client-side payment application that is capable of transmitting payment information to a merchant device, such as merchant device 120. Secure element 112 and payment application 116 are described in further detail with regard to the figures.

In the example embodiment, authentication application 114 is an application that is capable of detecting if wearable device 110 is an "open" state or a "closed" state, and based on the detecting, is capable of removing access to secure element 112. Furthermore, authentication application 114 is capable of receiving authentication input from a user received via the fingerprint reader located on wearable device 110, comparing it against stored authentication information and determining whether to authenticate the user. In addition, based on verifying/authenticating the user, authentication application 114 may activate and allow access to secure element 112 so that the user of wearable device 110 may be able to make a payment. Authentication application 114 is described in further detail with regard to the figures.

In addition, although in the example embodiment, payment application 116 is located on a secure element, in other embodiments, wearable device 110 may not contain a secure element and payment application 116, therefore may not be contained within a secure element.

Figure 2:
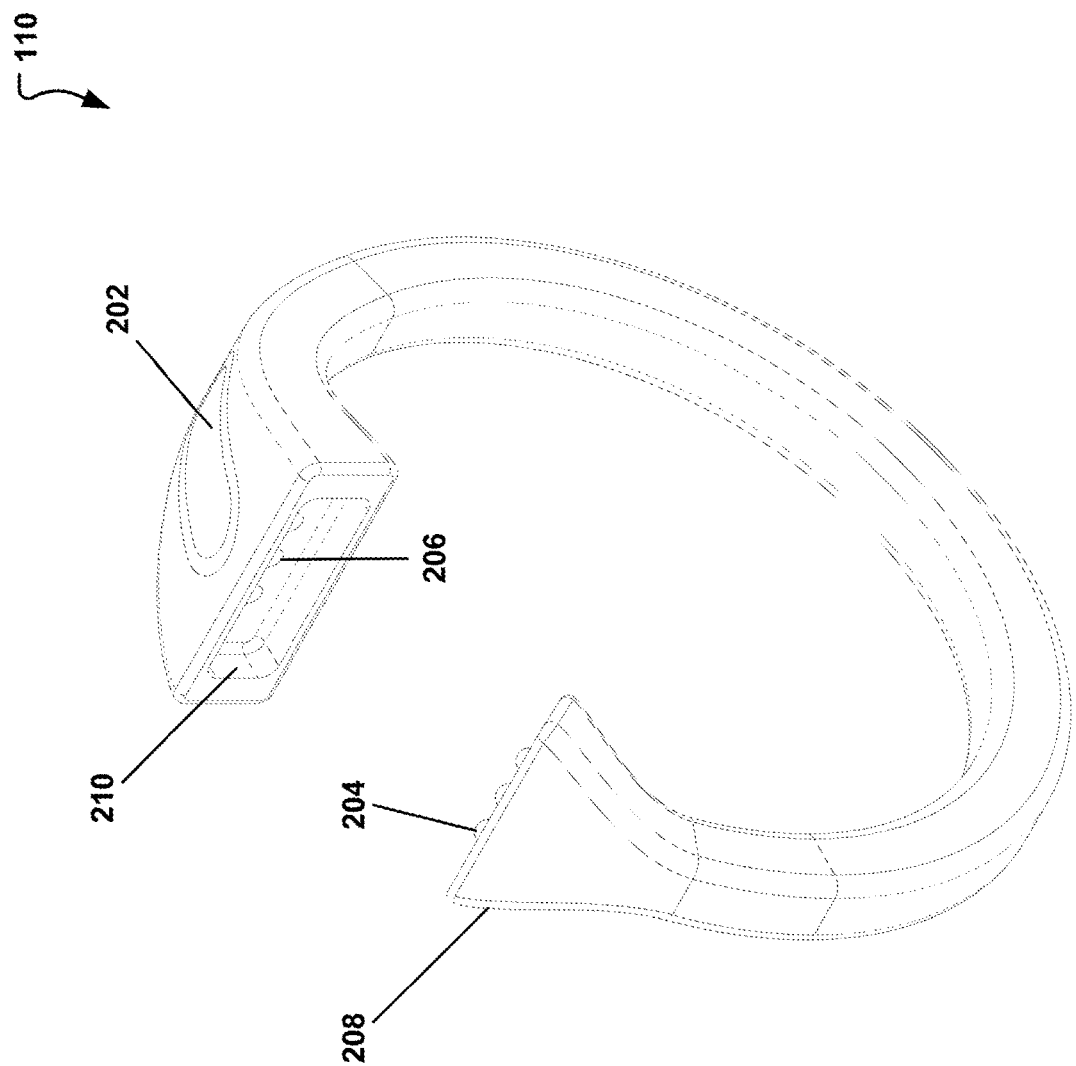
FIG. 2 illustrates a first view of the wearable device of FIG. 1, in accordance with an embodiment.

FIG. 2 illustrates a first view of the wearable device 110, in accordance with an embodiment. In the example embodiment, FIG. 2 illustrates wearable device 110 while in an "open" state. In other words, an "open" state refers to a state in which the male connectors 204 are not inserted into the female connectors 206 (receptacles). Furthermore, wearable device 110 may include insertable component 208 that may (when wearable device 110 is in a "closed" state), at least partially, fit within cavity 210 to allow for male connectors 204 to connect with female connectors 206. Furthermore, wearable device 110 may include fingerprint reader 202, which allows for authentication application 114 to obtain a fingerprint from a user of wearable device 110, and further perform a verification of the fingerprint.

Figure 3:
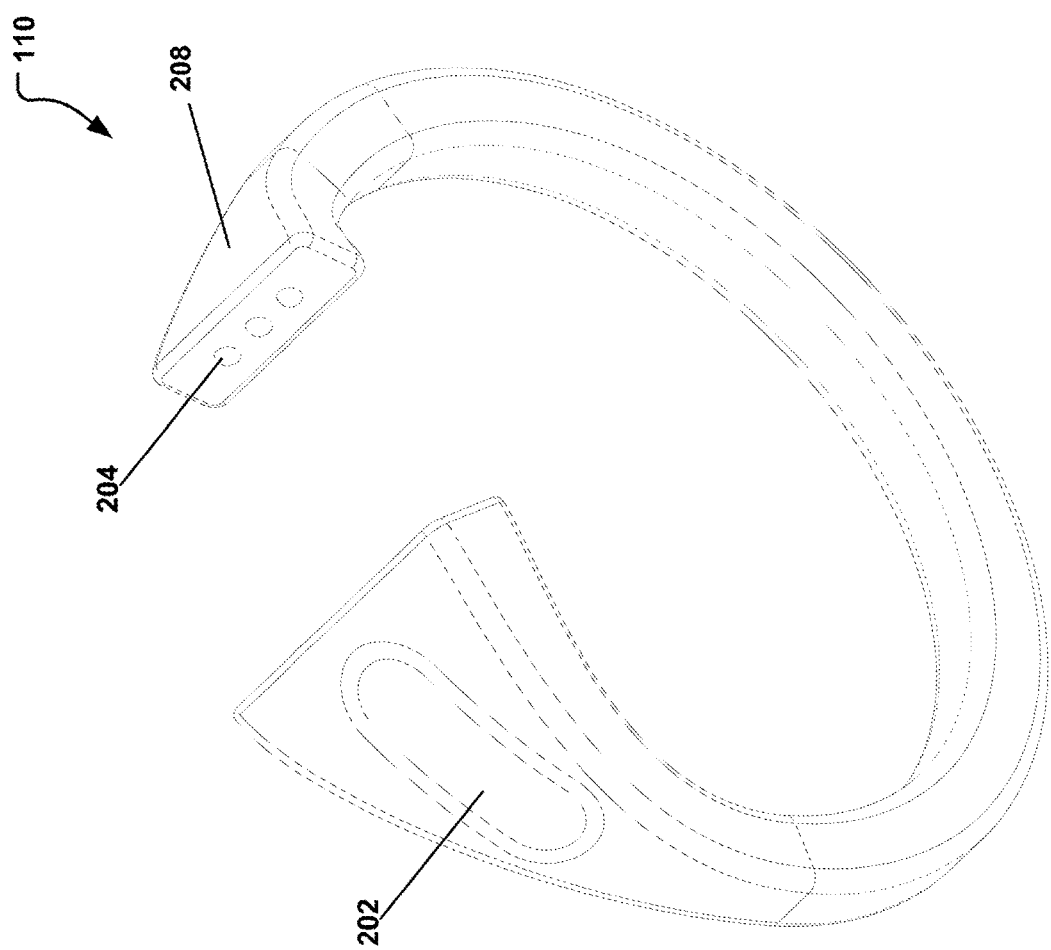
FIG. 3 illustrates a second view of the wearable device of FIG. 1, in accordance with an embodiment.

FIG. 3 illustrates a second view of wearable device 110, in accordance with an embodiment. In the example embodiment, FIG. 3 depicts a second view of wearable device 110 in an "open" state. In the example embodiment, FIG. 3 illustrates a side view of wearable device 110. Furthermore, FIG. 3 depicts fingerprint reader 202, male connectors 204, and insertable component 208. While, in the example embodiment, fingerprint reader 202 is located above (and partially adjacent to) cavity 210, in other embodiments, fingerprint reader 202 may be located on a different portion of the surface of wearable device 110.

Figure 4:
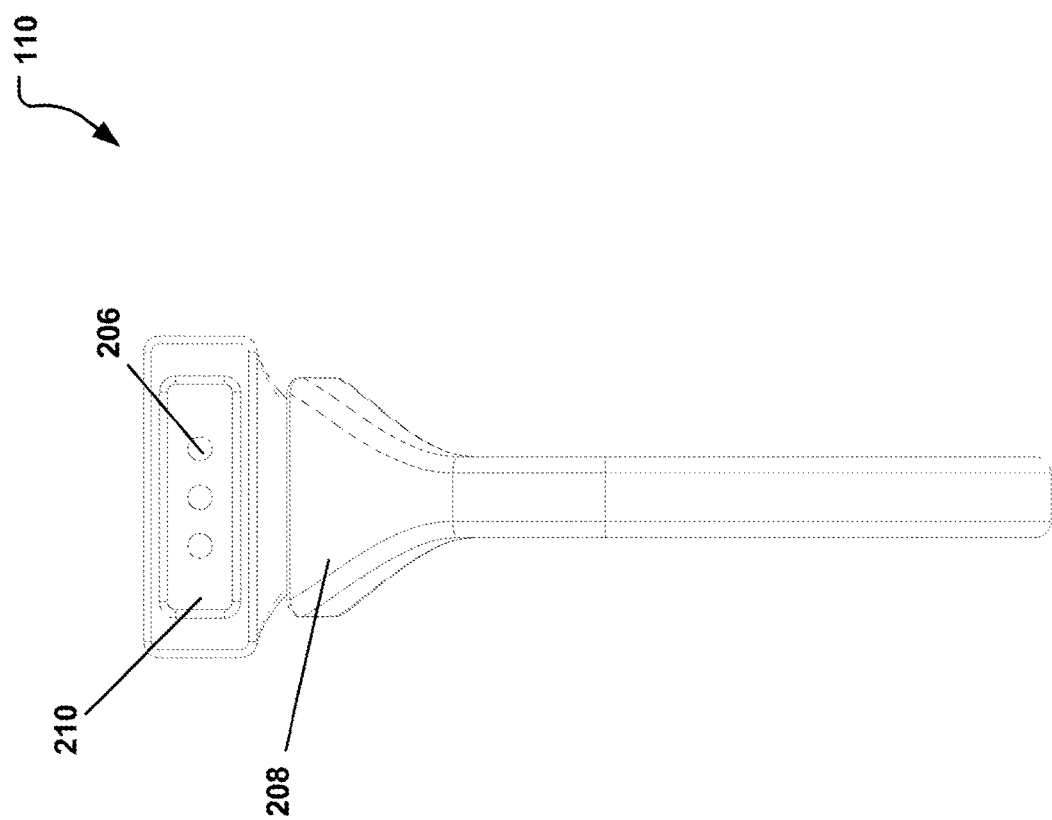
FIG. 4 illustrates a third view of the wearable device of FIG. 1, in accordance with an embodiment.

FIG. 4 illustrates a third view of wearable device 110, in accordance with an embodiment. In the example embodiment, FIG. 4 illustrates a third view of wearable device 110 in an "open" state. In the example embodiment, FIG. 4 depicts insertable component 208, cavity 210, and female connectors 206.

Figure 5:
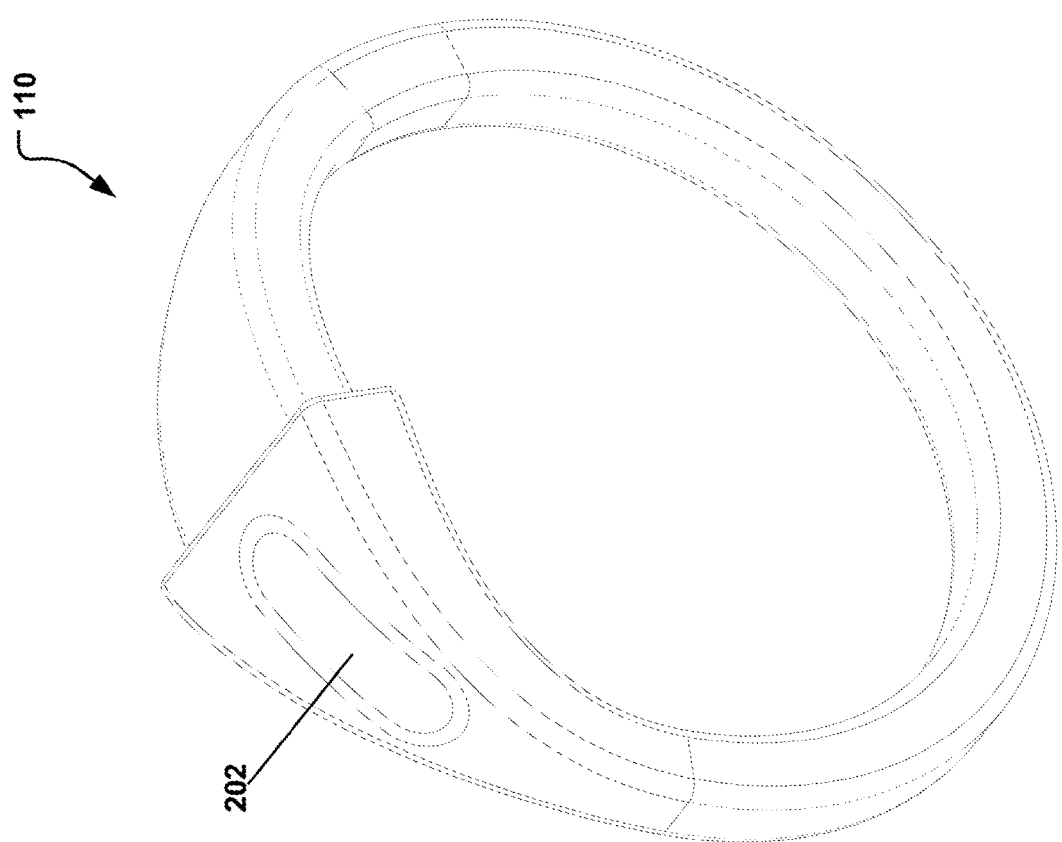
FIG. 5 illustrates a fourth view of the wearable device of FIG. 1, in accordance with an embodiment.

FIG. 5 illustrates a fourth view of wearable device 110, in accordance with an embodiment. In the example embodiment, FIG. 5 depicts wearable device 110 in a "closed" state. In the example embodiment, a "closed" state corresponds to a state of wearable device 110 where insertable component 208 has been inserted (at least partially) into cavity 210 to allow for male connectors 204 to connect with female connectors 206. In the example embodiment, upon detecting that wearable device 110 is in a "closed" state, authentication application 114 may activate fingerprint reader 202 and allow for authentication of a user of wearable device 110. Furthermore, based on a successful authentication, authentication application 114 may allow the user of wearable device 110 to utilize wearable device 110 to perform a payment via payment application 116.

In addition, while FIGS. 2 through 5 depict wearable device 110 as including 3 male connectors and 3 female connectors, in other embodiments, wearable device 110 may have a different number of male connectors and/or female connectors. Further, in one or more embodiments, rather than including male/female connectors, wearable device 110 may have alternate connectors that create a closed circuit or closed connection if they are in contact.

Figure 6:
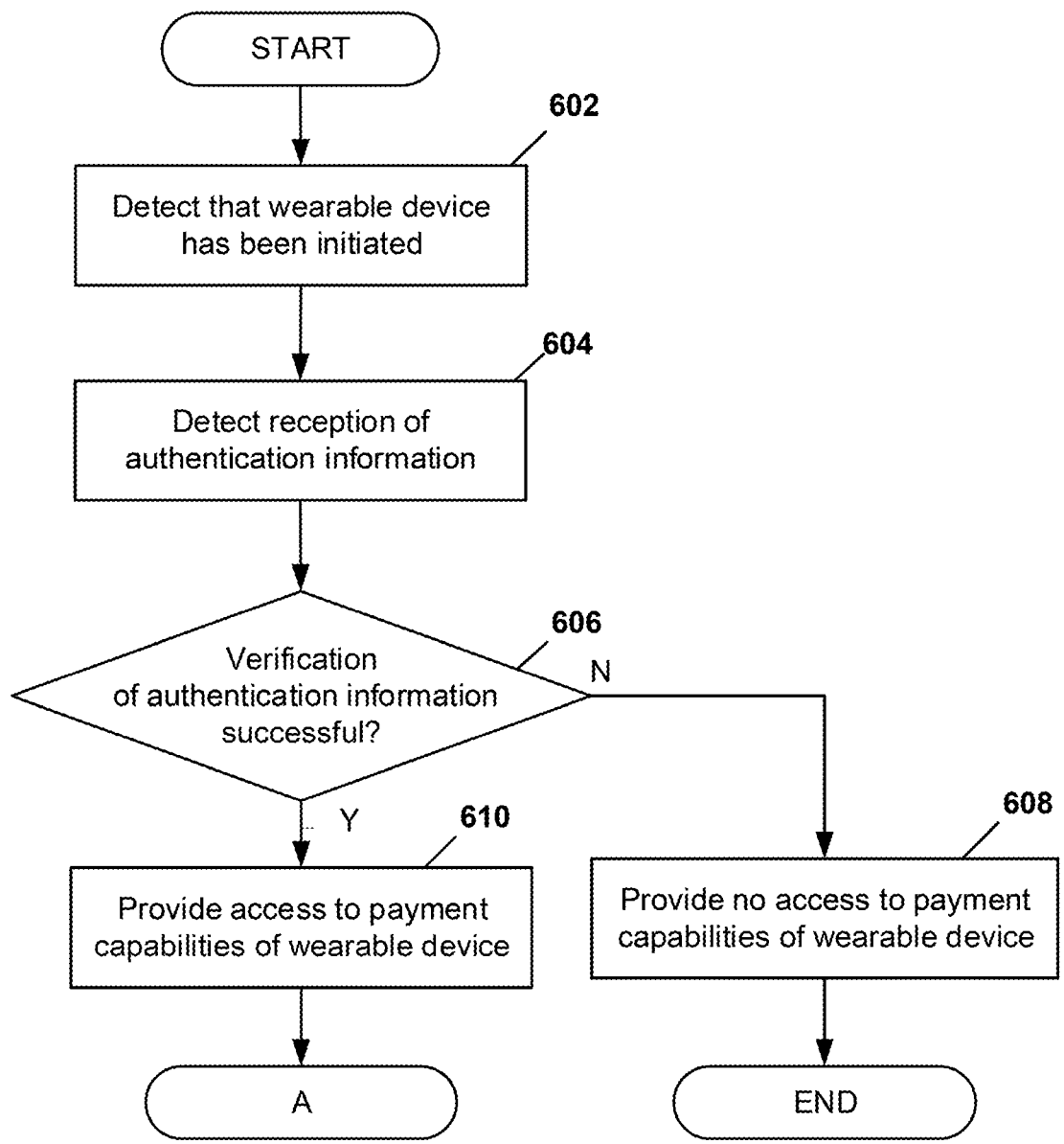
FIGS. 6 and 7 are a flowchart illustrating the operations of the wearable device of FIG. 1 in authenticating a user, providing access to payment functionality, and determining whether to remove access to the payment functionality based on detecting whether the wearable device is in an open state, in accordance with an embodiment.
Figure 7:
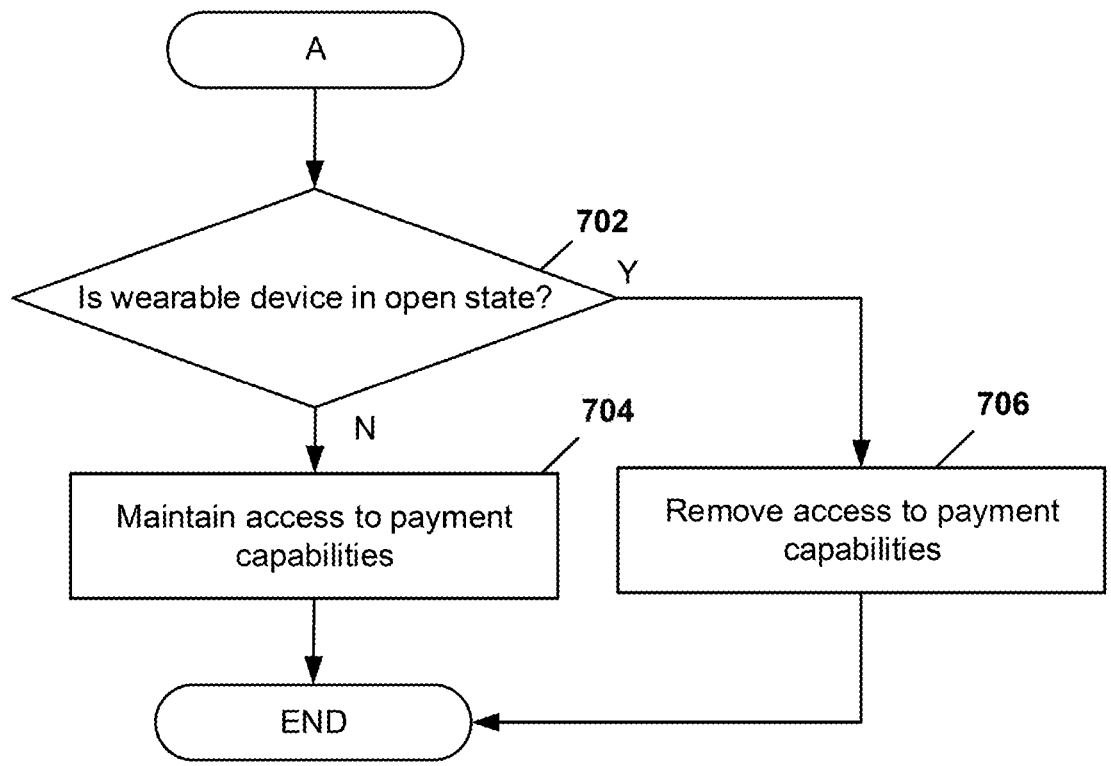

FIGS. 6 and 7 are a flowchart illustrating the operations of wearable device 110 in authenticating a user, providing access to payment functionality, and determining whether to remove access to the payment functionality based on detecting whether the wearable device is in an open state, in accordance with an embodiment.

In the example embodiment, authentication application 114 may detect that wearable device 110 has been initiated (step 602). In the example embodiment, authentication application 114 may detect that wearable device 110 has been initiated by detecting that wearable device 110 is in a "closed" state (i.e., male connectors 204 are connected to female connectors 206). In other words, when male connectors 204 connect with female connectors 206, an electric or magnetic connection may be made. Authentication application 114 may detect that the electric or magnetic connection has been made, and based on the detection, determine that wearable device 110 has been initiated (has been switched into a "closed" state). Furthermore, in other embodiments, authentication application 114 may detect that wearable device 110 is in a "closed" state based on detecting a motion of wearable device 110 and then comparing the motion to one or more stored patterns of body movements and determining if the detected motion substantially matches at least one of the one or more stored patterns. In further embodiments, authentication application 114 may detect that wearable device 110 is in a "closed" state based on transmitting a beam of light or laser from a surface of wearable device 110 (such as a portion of surface that may be substantially parallel to a limb of the user of wearable device 110. The beam may bounce off a surface (such as a wrist of the user of wearable device 110) and a distance may be calculated between surface of wearable device 110 and the surface that the beam bounced off. Utilizing this process, authentication application 114 may determine if wearable device 110 is on the limb/wrist of a user ("closed" state) or not ("open" state). In additional embodiments, other similar techniques may be utilized to determine if wearable device 110 is in an "open" or "closed" state.

In the example embodiment, authentication application 114 detects reception of authentication information from the user of wearable device 110 (step 604). In the example embodiment, authentication application 114 may detect reception of authentication information (a fingerprint) via fingerprint reader 202. In other embodiments, authentication application 114 may detect reception of another type of biometric information, such as a heartbeat data, voice data, facial image data, or retina data, by utilizing a corresponding biometric component (camera, retina scanner, microphone, etc.).

In the example embodiment, authentication application 114 determines if verification of the received authentication information is successful (decision 606). In the example embodiment, authentication application 114 may compare the received authentication information to authentication information stored on wearable device 110. In the example embodiment, where fingerprint information is received for the purpose of authentication, authentication application 114 may compare the fingerprint information received via fingerprint reader 202 to fingerprint information stored on wearable device 110 and determine if the received fingerprint information matches or substantially matches the fingerprint information stored on wearable device 110. In other embodiments, where other types of biometric information is received for the purpose of authentication, authentication application 114 may compare the received biometric information to biometric information stored on wearable device 110 to determine if the received biometric information matches or substantially matches the biometric information stored on wearable device 110.

If the received authentication information does not match or substantially match the authentication information stored on wearable device 110, authentication application 114 may determine that the verification of the received authentication information is not successful (decision 606, "NO" branch), and may therefore may not provide access to payment capabilities of wearable device 110 (step 608). In the example embodiment, authentication application 114 may also send a haptic, auditory, or visual feedback indicating that the authentication was not successful. Furthermore, in one or more embodiments, authentication application 114 may continue to monitor for reception of subsequent authentication information, and based on determining authentication has been received, perform the verification steps described above.

If the received authentication information matches or substantially matches the authentication information stored on wearable device 110, authentication application 114 may determine that the verification of the received authentication information is successful (decision 606, "YES" branch), and may provide access to the payment capabilities of wearable device 110 (step 610). In the example embodiment, providing access to the payment capabilities of wearable device 110 may include activating secure element 112 and providing access to payment application 116. In other embodiments, where payment application 116 is not located in secure element 112, providing access to the payment capabilities of wearable device 110 may include providing access to payment application 116. Furthermore, in one or more embodiments, authentication application 114 may also send a haptic, auditory, or visual feedback indicating that the authentication was successful (which may be different than the feedback indicating that the authentication was not successful).

In the example embodiment, if access to payment capabilities is provided based on a successful verification (step 610), authentication application 114 may determine if wearable device 110 has been switched to an open state (decision 702). In the example embodiment, wearable device 110 may be determined to have switched from a "closed" state to an "open" state if, for example, authentication application 114 determines that the male connectors 204 are no longer connected or engaged with female connectors 206 (i.e., the electric or magnetic connection has been broken). In other embodiments, authentication application 114 may utilize other techniques, such as those described above, to determine that wearable device 110 has switched from a "closed" state to an "open" state. For example, authentication application 114 may utilize a beam of light or laser (as described above) to determine that the wearable device is no longer on the limb/wrist of the user of wearable device 110, and therefore determine that wearable device 110 has been switched to an "open" state.

In other words, if wearable device 110 has been switched to an "open" state, the device may no longer be in the possession of the user of wearable device 110 (it may have been taken off or may have fallen off), and therefore may be susceptible to being used by a fraudster. Therefore, if authentication application 114 determines that wearable device 110 has been switched to an "open" state (decision 702, "YES" branch), authentication application 114 may remove access to payment capabilities of wearable device 110 (step 706). In the example embodiment, authentication application 114 may remove access to payment application 116 (and may remove access to secure element 112 or deactivate secure element 112). Furthermore, authentication application 114 may require that the user once again submit authentication credentials (which must then be verified) in order for access to payment capabilities to be reinstated. For example, if the user of wearable device 110 removes wearable device 110, upon detecting that wearable device 110 has switched to an "open" state (wearable device 110 has been taken off), authentication application 114 may remove access to the payment capabilities of wearable device 110, and further, may require (and may prompt) the user of wearable device 110 to input the appropriate authentication credentials (fingerprint, biometric info, etc.) in order for payment capabilities to be restored. In one or more embodiments, removing access to the payment capabilities of wearable device 110 may also include updating a status of wearable device 110 to an "unverified" status (from a "verified" status).

If authentication application 114 determines that wearable device 110 has not been switched to an "open" state, and therefore, remains in a "closed" state (decision 702, "NO" branch), authentication application 114 may maintain access to the payment capabilities of wearable device 110 (step 704).

While in the example embodiment, authentication application 114 may initially detect that wearable device 110 has been initiated (i.e., detect that wearable device 110 is in a "closed" state) prior to performing a verification of authentication information of a user, in other embodiments, authentication application 114 may first verify the authentication information of a user, and then, after a successful verification, may provide the user of wearable device 110 a threshold period of time to put wearable device 110 into a "closed" state (i.e., put wearable device 110 on) prior to authentication application 114 initiating the monitoring protocol of determining if wearable device 110 has been switched to an "open" state, as described above. Upon detecting that the user of wearable device 110 has put wearable device 110 into a "closed" state (within the threshold time period), authentication application 114 may then monitor if wearable device 110 switches to an "open" state, and based on the monitoring, determine whether to remove access to the payment capabilities of wearable device 110.

In addition, in the example embodiment, upon verification of a user's authentication information, authentication application 114 may allow the user to utilize the payment capabilities of wearable device 110 for multiple transactions without requiring authentication information to be provided again (until the wearable device is switched to an "open" state). For example, the user of wearable device 110 may provide authentication information, which may be verified by authentication application 114, as described above. The user may then perform a first NFC transaction with a first merchant device (by way of placing wearable device 110 within a proximity of the merchant device), and may further perform a second NFC transaction with a second merchant device without providing any additional authentication information (with regard to either transaction). Therefore, the user of wearable device 110 may perform multiple transactions via NFC or via a network connection without providing additional authentication information (as long as wearable device 110 remains in a "closed" state).

In addition, while in the example embodiment, wearable device 110 is utilized for payments, in other embodiments, wearable device 110 may be utilized for other functions, such as checking in to a hotel or flight, performing a check-in at a merchant location (such as via a beacon device), or performing another form of monetary or non-monetary electronic transaction. For example, for the purpose of utilizing wearable device 110 to check-in to a merchant location, authentication application 114 may perform a verification of received authentication information, as described above, and based on a successful verification, may allow access to a check-in application (located on wearable device 110) capable of communicating with a merchant device or beacon for the purpose of performing a check-in. Furthermore, as stated above, upon determination that wearable device 110 has been switched to an "open" state, authentication application 114 may remove access to the check-in application, and further may require re-authentication in order to restore check-in capabilities.

Furthermore, in one or more embodiments, authentication application 114 may provide a second layer of security when a payment is being performed. In the one or more embodiments, authentication application 114 may utilize an accelerometer to detect a movement pattern associated with the wearable device 110, to determine if a payment (or check-in or other action) that occurred was intended. For example, by being within a proximity of a merchant device or a beacon, a user of wearable device 110 may accidentally perform a payment that was not intended. In order to prevent this, authentication application 114 may monitor a user's movement patterns upon performing a payment and store the patterns in memory. With regard to subsequent payments, authentication application 114 may detect a corresponding movement pattern and compare the detected movement pattern against the stored patterns in order to determine if the detected movement pattern substantially matches (within a threshold) one or more stored patterns. If authentication application 114 determines that the detected movement pattern does not substantially match a stored pattern, authentication application 114 may determine that the payment was not intended and provide the user a notification or indication that an unintended payment has occurred.

Furthermore, in one or more embodiments, upon verification, the user of wearable device 110 may perform a payment using wearable device 110. In one or more embodiments, payment application may utilize a key (a private key) stored in secure element 112 to digitally sign the payment data prior to transmitting to merchant device 120 (or payment server 140). Furthermore, upon reception of the payment data by payment application 142, payment application 142 may verify the user of wearable device 110 via the digital signature and process the payment. In addition, while in the example embodiment, wearable device 110 may communicate with merchant device 120 via an NFC connection in order to complete a payment (or other action), in other embodiments, wearable device 110 may utilize a network connection (such as a WIFI connection) in order to communicate with merchant device 120 (or payment server 140).

Furthermore, in additional embodiments, wearable device 110 may be utilized for two factor authentication or for providing authentication information to other devices. For example, upon connecting with a device (via NFC or a network connection), wearable device 110 may be utilized by a user to provide a fingerprint (for example if the device does not have the components to capture a fingerprint). In additional embodiments, wearable device 110 may be utilized to pass on biometric/authentication information to a device that requires the information to proceed with an action, such signing up for a service. In this circumstance, the user of wearable device 110 may not be required to re-enter authentication information, but rather, wearable device 110 may transmit the already entered authentication information to one or more devices.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 8:
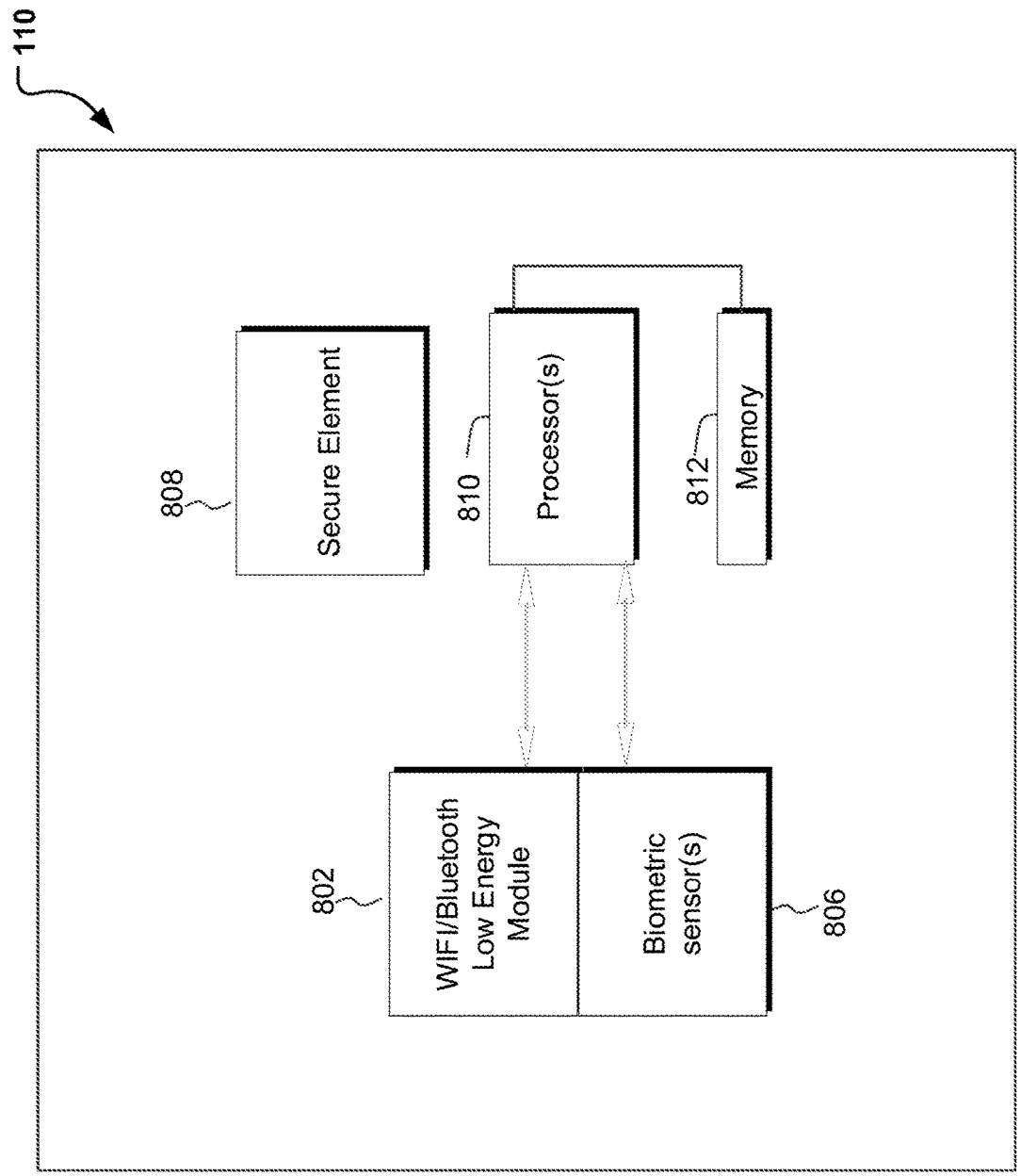
FIG. 8 is a block diagram depicting the components of the wearable device of FIG. 1, in accordance with an embodiment.

FIG. 8 depicts a block diagram of components of wearable device 110, in accordance with an embodiment. It should be appreciated that FIG. 8 provides only an illustration of one implementation and does not imply any limitations with regard to the environments in which different embodiments may be implemented. Many modifications to the depicted environment may be made. In the example embodiment, as depicted, wearable device may include one or more WIFI/Bluetooth Low Energy (BLE) Modules 802 capable of supporting WIFI or BLE communications/connections. Furthermore, wearable device may additionally include one or more processors 810, one or more secure elements 808, one or more memories 812, and one or more biometric sensors 806.

Figure 9:
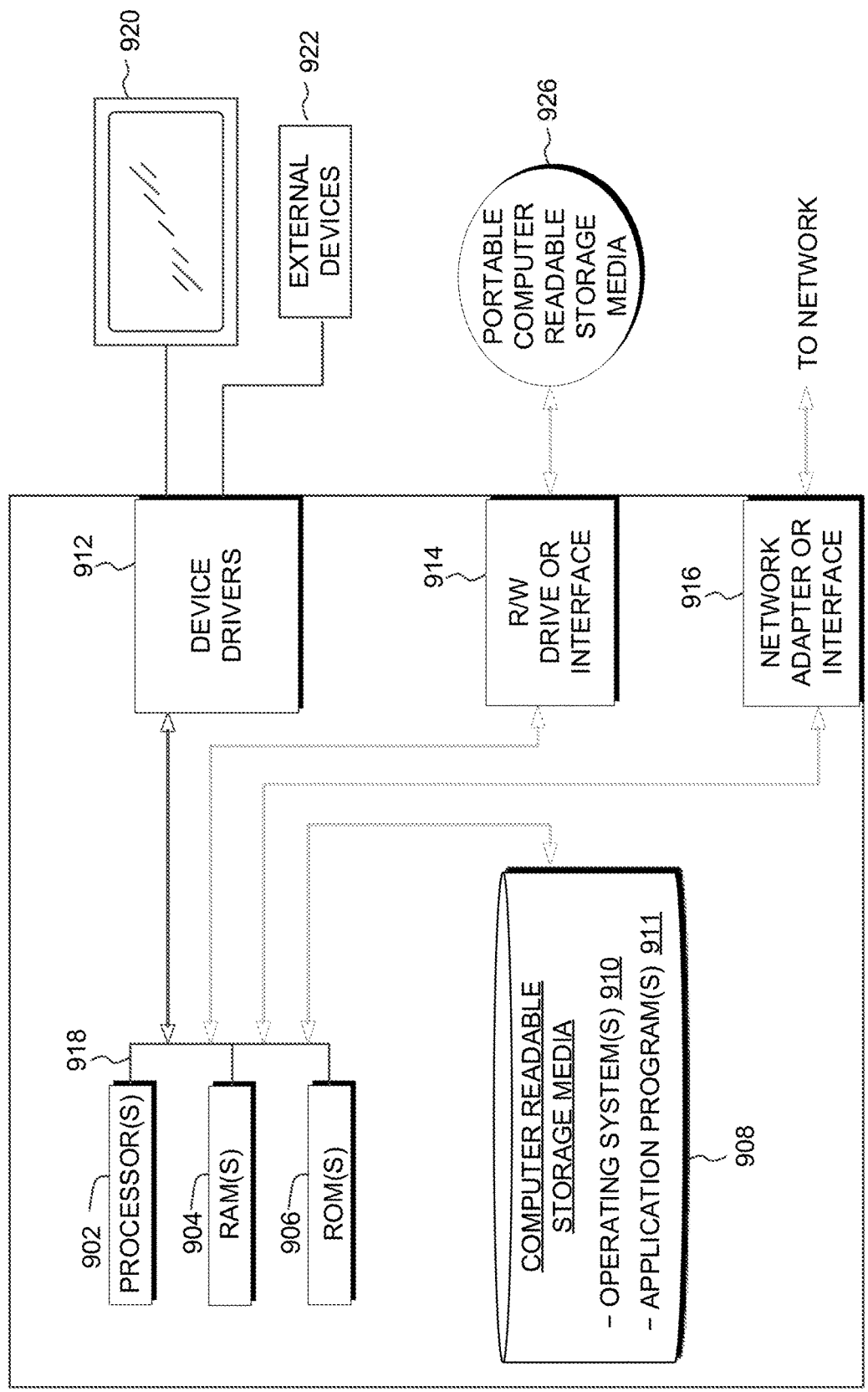
FIG. 9 is a block diagram depicting the components of the computing devices contained in the payment system of FIG. 1, in accordance with an embodiment.

FIG. 9 depicts a block diagram of components of computing devices contained in payment system 100 of FIG. 1, in accordance with an embodiment. It should be appreciated that FIG. 9 provides only an illustration of one implementation and does not imply any limitations with regard to the environments in which different embodiments may be implemented. Many modifications to the depicted environment may be made. Furthermore, FIG. 9 provides an alternative embodiment for the components of wearable device 110, with FIG. 8 providing another embodiment. In addition, wearable device 110 may include a combination of the one or more of the components contained within FIG. 8 and FIG. 9, along with additional components that are not depicted.

Computing devices may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, authentication application 114, are stored on one or more of the computer readable storage media 908 for execution by one or more of the processors 902 and by utilizing one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 914 to read from and write to one or more portable computer readable storage media 926. Application programs 911 on the computing devices may be stored on one or more of the portable computer readable storage media 926, read via the respective R/W drive or interface 914 and loaded into the respective computer readable storage media 908.

Computing devices may also include a network adapter or interface 916, such as a TCP/IP adapter card or wireless communication adapter (such as a 4G wireless communication adapter using OFDMA technology). Application programs 911 on the computing devices may be downloaded to the computing devices from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing devices may also include a display screen 920, and external devices 922, which may include, for example a keyboard, a computer mouse and/or touchpad. Device drivers 912 interface to display screen 920 for imaging, to external devices 922, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A wearable device, comprising:
one or more computer-readable memories storing program instructions; and
one or more processors configured to execute the program instructions to cause the wearable device to perform operations comprising:
determining, during a first time period, whether a first portion and a second portion of the wearable device are electrically or magnetically connected;
receiving, during the first time period, authentication information from a user;
in response to determining, during the first time period, that the first portion and the second portion of the wearable device are electrically or magnetically connected and verifying the authentication information, providing the user with access to one or more payment capabilities of the wearable device;
authenticating, during the first time period, a payment based on a monitored movement pattern associated with the wearable device matching a pre-established stored movement pattern corresponding to a payment action; and in response to determining, during a second time period, that the first portion and the second portion of the wearable device are not electrically or magnetically connected, removing the access to the one or more payment capabilities of the wearable device.

2. The wearable device of claim 1, wherein the authentication information includes fingerprint information or voice information.

3. The wearable device of claim 1, wherein the providing the user with the access to one or more payment capabilities of the wearable device includes activating a secure element that contains a payment application.

4. The wearable device of claim 1, wherein the authentication information includes retinal information.

5. The wearable device of claim 1, the operations further comprising in response to the determining, during the first time period, that the first portion and the second portion of the wearable device are electrically or magnetically connected, prompting the user to provide the authentication information.

6. The wearable device of claim 5, wherein the authentication information includes facial image information.

7. The wearable device of claim 1, wherein the removing the access to the one or more payment capabilities of the wearable device includes prompting the user of the wearable device to provide the authentication information.

8. A non-transitory computer-readable medium storing computer-executable instructions, that in response to execution by one or more hardware processors, causes the one or more hardware processors to perform operations comprising:
   determining, during a first time period, whether a first portion and a second portion of a wearable device are electrically or magnetically connected;
   receiving, during the first time period, authentication information from a user;
   in response to determining, during the first time period, that the first portion and the second portion of the wearable device are electrically or magnetically connected and verifying the authentication information, providing the user with access to one or more payment capabilities of the wearable device;
   authenticating, during the first time period, a payment based on a monitored movement pattern associated with the wearable device matching a pre-established stored movement pattern corresponding to a payment action; and
   in response to determining, during a second time period, that the first portion and the second portion of the wearable device are not electrically or magnetically connected, removing the access to the one or more payment capabilities of the wearable device.

9. The non-transitory computer-readable medium of claim 8, wherein the authentication information includes a fingerprint of the user.

10. The non-transitory computer-readable medium of claim 8, wherein the providing the user with the access to one or more payment capabilities of the wearable device includes activating a secure element that contains a payment application.

11. The non-transitory computer-readable medium of claim 8, wherein the authentication information includes voice information corresponding to the user.

12. The non-transitory computer-readable medium of claim 8, the operations further comprising in response to the determining, during the first time period, that the first portion and the second portion of the wearable device are electrically or magnetically connected, prompting the user to provide the authentication information.

13. The non-transitory computer-readable medium of claim 12, wherein the authentication information includes facial image information.

14. The non-transitory computer-readable medium of claim 8, wherein the removing the access to the one or more payment capabilities of the wearable device includes deactivating a secure element on the wearable device that contains a payment application.

15. A method, comprising:
   determining, by a wearable device during a first time period, whether a first portion and a second portion of the wearable device are electrically or magnetically connected;
   in response to determining that the first portion of the wearable device is electrically or magnetically connected to the second portion of the wearable device, receiving, by the wearable device during the first time period, authentication information from a user;
   in response to receiving the authentication information from the user, verifying, by the wearable device, the authentication information;
   in response to determining, by the wearable device during the first time period, that the first portion and the second portion of the wearable device are electrically or magnetically connected and the verifying the authentication information, providing the user with access to one or more payment capabilities of the wearable device;
   authenticating, by the wearable device during the first time period, a first payment to be processed based on a monitored movement pattern associated with the wearable device matching a pre-established stored movement pattern corresponding to a payment action; and
   in response to determining, during a second time period, that the first portion and the second portion of the wearable device are not electrically or magnetically connected, removing the access to the one or more payment capabilities of the wearable device.

16. The method of claim 15, wherein the authentication information includes retinal information corresponding to the user.

17. The method of claim 15, wherein the authentication information includes facial image information corresponding to the user.

18. The method of claim 15, further comprising digitally signing and transmitting, by the wearable device, payment information to a merchant device.

19. The method of claim 18, wherein the authentication information includes a fingerprint of the user.

20. The method of claim 15, wherein the verifying the authentication information includes determining if the received authentication information corresponds to a stored authentication information.

* * * * *